US012775087B2

(12) United States Patent
Lin et al.

(10) Patent No.: US 12,775,087 B2
(45) Date of Patent: Oct. 27, 2026

(54) INFORMATION HANDLING SYSTEM TO CONTROL ULTRASOUND ENABLE/DISABLE WITH USER PRESENCE DETECTION

(71) Applicant: DELL PRODUCTS L.P., Round Rock, TX (US)

(72) Inventors: Yung-Sheng Lin, Bade District (TW); Shun-Tang Hsu, Taipei (TW); Bryan Thornley, Burnet, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/975,255

(22) Filed: Dec. 10, 2024

(65) Prior Publication Data

US 2026/0160886 A1 Jun. 11, 2026

(51) Int. Cl.
*G01S 15/86* (2020.01)
*G01S 15/04* (2006.01)

(52) U.S. Cl.
CPC .............. *G01S 15/86* (2020.01); *G01S 15/04* (2013.01)

(58) Field of Classification Search
CPC ................................ G01S 15/86; G01S 15/04
See application file for complete search history.

(56) References Cited

U.S. PATENT DOCUMENTS

| | | | | |
|---|---|---|---|---|
| 2013/0229508 | A1* | 9/2013 | Li | G06F 1/3287 348/77 |
| 2022/0262223 | A1 | 8/2022 | Kamepalli et al. | |
| 2024/0193574 | A1* | 6/2024 | Kishore Bajaj | G07G 1/0036 |
| 2024/0193950 | A1* | 6/2024 | Sun | G08B 21/00 |
| 2024/0214750 | A1* | 6/2024 | James | H04R 25/50 |
| 2024/0241934 | A1 | 7/2024 | Reddy et al. | |

* cited by examiner

*Primary Examiner* — Michael E Teitelbaum
(74) *Attorney, Agent, or Firm* — Larson Newman, LLP

(57) ABSTRACT

An information handling system includes an ultrasound processor, a vision processor, and a processor. The ultrasound processor performs a wide area presence detection. The vision processor performs user presence detection. The information handling system determines whether a user presence detection event has been received from the vision processor. In response to reception of the user presence detection event, the information handling system turns off the ultrasound processor. In response to the user presence detection event not being received: the information handling system turns off the vision processor; and determines whether an object detection event has been received from the ultrasound processor.

20 Claims, 4 Drawing Sheets

INFORMATION HANDLING SYSTEM TO CONTROL ULTRASOUND ENABLE/DISABLE WITH USER PRESENCE DETECTION

FIELD OF THE DISCLOSURE

The present disclosure generally relates to information handling systems, and more particularly relates to controlling an ultrasound enable/disable with user presence detection within an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes an ultrasound processor, a vision processor, and a processor. The ultrasound processor may perform a wide area presence detection. The vision processor may perform user presence detection. The information handling system may determine whether a user presence detection event has been received from the vision processor. In response to reception of the user presence detection event, the information handling system may deactivate the ultrasound processor. In response to the user presence detection event not being received, the information handling system may deactivate the vision processor and determine whether an object detection event has been received from the ultrasound processor.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
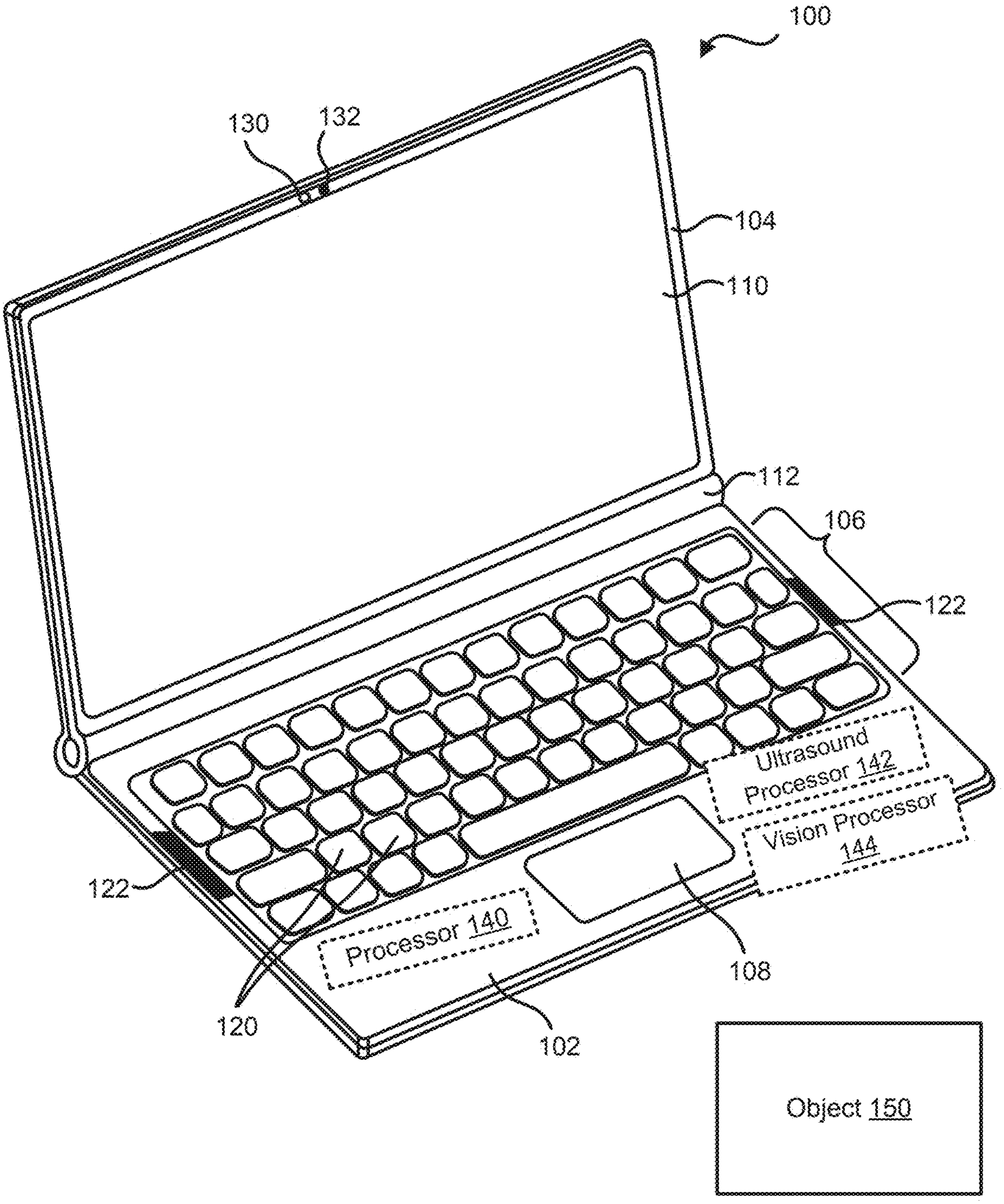
FIGS. 1 and 2 are diagrams of an information handling system according to at least one embodiment of the present disclosure.
Figure 2:
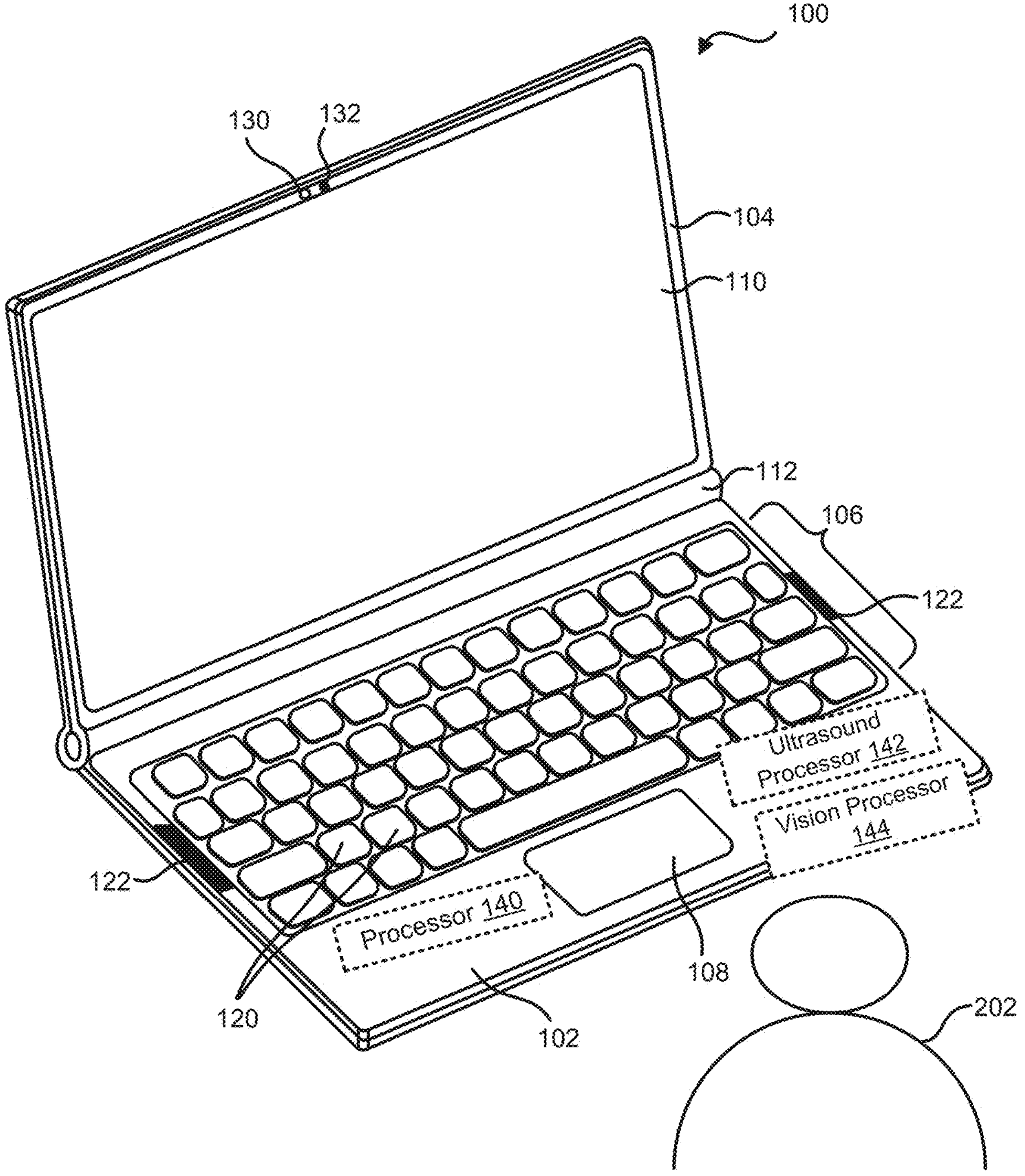

FIGS. 1 and 2 illustrate an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a base portion 102 and a top 104. Base portion 102 includes a keyboard 106 and a touchpad 108, and top portion 104 includes a display device 110. In an example, touchpad 108 may be any suitable pointing device. Base portion 102 is connected top portion 104 via a mechanism 112, such as one or more hinges. Keyboard 106 includes multiple keys 120. Base portion 102 further includes speakers 122. Top portion 104 includes a camera 130 and a microphone 132. Information handling system 100 further includes a processor 140, an ultrasound processor 142, and a vision processor 144. Information handling system 100 may include additional components without varying from the scope of the disclosure.

When the information handling system 100 includes a 2-in-1 device, mechanism 112 may enable the top portion 104 to be connected to bottom portion 102 for use as a laptop device and may enable the top portion 104 to be detached from bottom portion 102 to enable the top portion 104 to be used as a tablet information handling system. Display device 110 may include one or more light emitting devices, such as, for example, light emitting diodes (LEDs), organic LED (OLED), liquid crystal display (LCD), another type of light emitting device, or any combination thereof.

In certain examples, ultrasound processor 142 and vision processor 144 may utilize components within information handling system 100 to perform user presence detection (UPD). Ultrasound processor 142 may utilize speakers 122, microphone 132, and other components within information handling system 100 to perform long range UPD or object detection. Vision processor 144 may utilize camera 130 and other components to perform near UPD. The performance of the ultrasound detection components differs from the performance of the vision detection components. Each set of detection components have different advantages and disadvantages for UPD or object detection. For example, ultrasound processor 142 and the corresponding components of the ultrasound detection may have a wider and longer range as compared to vision processor 144 and its corresponding components for vision detection. However, vision processor 144 may be more precise in UPD when a user, such as user 202 of FIG. 2, is located in front of information handling system 100. In an example, UPD and other object detection in information handling system 100 may be improved by processor 140 selectively enabling/disabling ultrasound processor 142 and vision processor 144 as will be described herein.

Upon information handling system 100 booting, processor 140 may activate either ultrasound processor 142 or vision processor 144, or both of the ultrasound processor and the vision processor. In a non limiting example, upon information handling system 100 booting, processor 140 may activate ultrasound processor 142 and deactivate vision processor 144. When vision processor 144 is deactivated, the vision processor may be placed in a low power state. In this situation, power usage in information handling system 100 may be reduced based on vision processor 144 being in the low power state.

In an example, ultrasound processor 142 may utilize microphone 132 and speakers 122 to perform objected detection near information handling system 100. In certain examples, the objection detection performed by ultrasound processor 142, microphone 132, and speakers 122 may be referred to as the wide area presence detection. The wide area presence detection performed by ultrasound processor 142 may have a specific detection arc. For example, the wide area presence detection may have a one-hundred-and-eighty-degree detection arc. In certain examples, ultrasound processor 142 may monitor the return ultrasound signals received at microphone 132. Based on the return ultrasound signals, ultrasound processor 142 may determine whether an object 150 located near information handling system 100. In response to object 150 being detected, processor 130 may activate camera 130 and vision processor 144.

Referring now to FIG. 2, vision processor 144 may utilize camera 130 to perform user presence detection (UPD). The UPD performed by vision processor 144 may have a specific detection arc that is less than the detection arc of the wide area presence detection. For example, the UPD may have a detection arc that is between seventy and eighty degrees. While vision processor 144 is performing UPD, the vision processor may analyze the images captured by camera 130 to determine whether a user 202 is located in front of information handling system 100.

In response to the detection of the UPD, vision processor 144 may provide a user presence detection event to processor 140. Based on the reception of the human presence detect event, processor 140 may deactivate ultrasound processor 142, which in turn may cause microphone 132 to stop providing the ultrasound signal. Thus, the deactivation of ultrasound processor 142 may cause microphone 132 and speakers 122 of information handling system 100 to no longer perform operations for wide area presence detection. In particular, microphone 132 and speakers 122 may no longer provide and receive ultrasound waves for the wide area presence detection.

In certain examples, vision processor 144 may continue to utilize camera 130 to determine whether user 202 continues to be located in front of information handling system 100. In response to a UPD no longer being detected, vision processor 144 may provide a no user presence detection event to processor 140. Based on the no user presence detection event, processor 140 may activate ultrasound processor 142 and deactivate vision processor 144. In certain examples, the activation of ultrasound processor 142 and the deactivation of vision processor 144 may place the components of information handling system 100 back into the wide area presence detection mode of operation. The operations of processor 140, ultrasound processor 142, and vision processor 144 may continue as described above.

Figure 3:
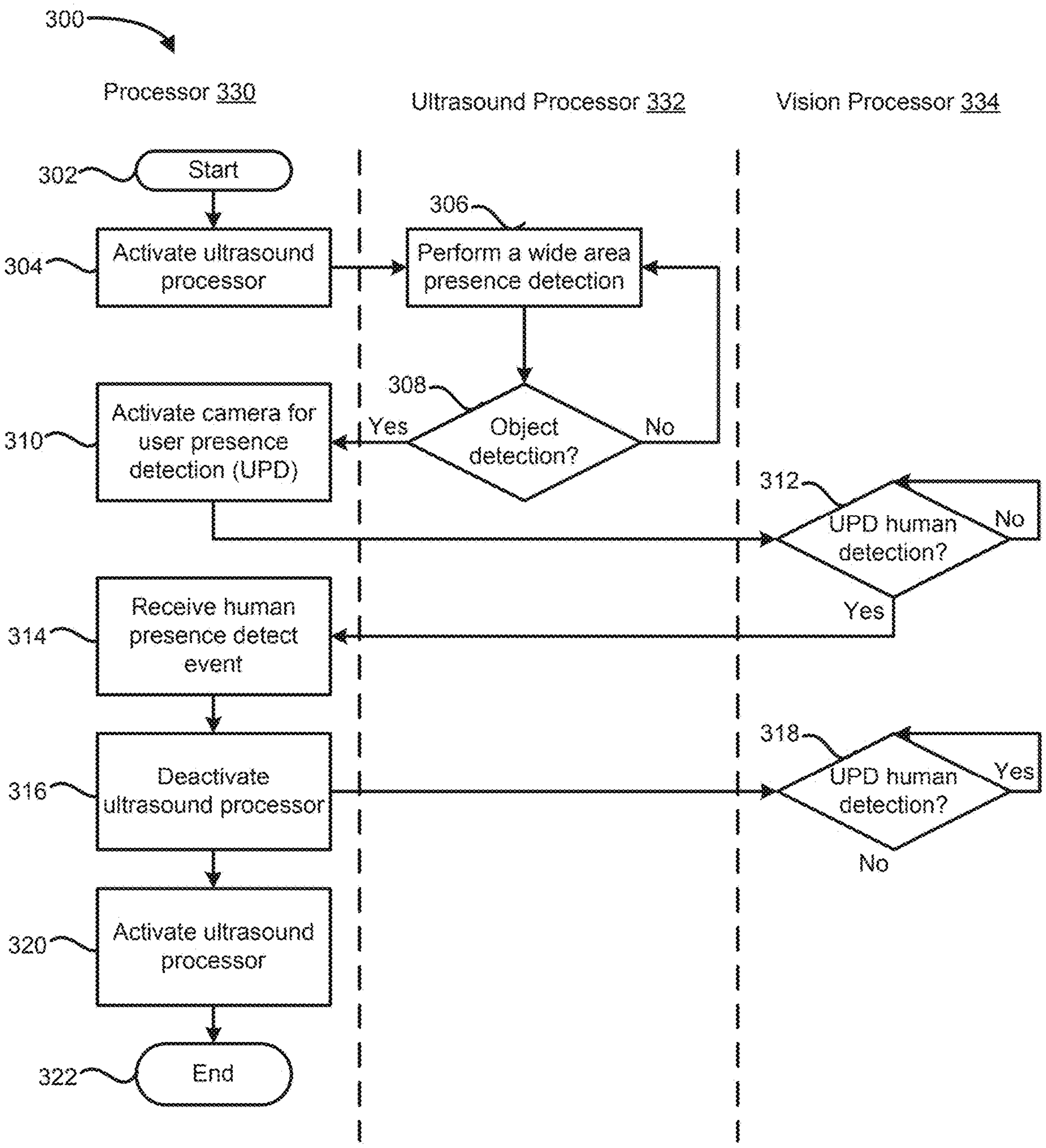
FIG. 3 is a flow diagram of a method for controlling ultrasound enable/disable with user presence detection according to at least one embodiment of the present disclosure.

FIG. 3 is a flow diagram of a method 300 for controlling ultrasound enable/disable with user presence detection according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, a processor 330, an ultrasound processor 322, or a vision processor 334, or any other type of controller, device, module, processor, or any combination thereof, operable to employ all, or portions of, the method of FIG. 3. In an example, processor 330, ultrasound processor 332, and vision processor 334 may be substantially equal processor 402 or 404 of FIG. 4.

At block 304, ultrasound processor 332 of an information handling system is activated. In an example, ultrasound processor 332 may utilize a microphone and speakers of the information handling system to perform objected detection near the information handling system. At block 306, a wide area presence detection is performed. In certain examples, the wide area presence detection may be performed by ultrasound processor 332. The wide area presence detection performed by ultrasound processor 332 may have a specific detection arc. For example, the wide area presence detection may have a one-hundred-and-eighty-degree detection arc. In an example, vision processor 334 may be in a low power state while the wide area presence detection is being performed.

At block 308, a determination is made whether an object is detected by ultrasound processor 332. In response to an object being detected, a camera is activated at block 310. In an example, vision processor 334 may utilize the camera to perform user presence detection (UPD). The UPD performed by vision processor 334 may have a specific detection arc that is less than the detection arc of the wide area presence detection. For example, the UPD may have a detection arc that is between seventy and eighty degrees. At block 312, a determination is made whether a UPD has been detected. In certain examples, vision processor 334 may analyze the images captured by the camera to determine whether a user is located in front of the information handling system.

In response to the detection of the UPD by vision processor 334, processor 330 may receive a human presence detect event at block 314. Based on the reception of the human presence detect event, processor 330 may deactivate ultrasound processor 332. In an example, the deactivation of ultrasound processor 332 may cause the microphone and speakers of the information handling system to no longer perform operations for wide area presence detection. In particular, the microphone and speakers may no longer provide and receive ultrasound waves for the wide area presence detection.

At block 318, vision processor 334 may continue to utilize the camera of the information handling system to determine whether a user continues to be located in front of the information handling system. In response to a UPD no longer being detected by vision processor 334, processor 330 may activate ultrasound processor 332 and deactivate the vision processor at block 320 and the flow ends at block 322. In certain examples, the activation of ultrasound processor 332 and the deactivation of vision processor 334 may place the components of the information handling system back into the state at block 304, such that the flow may continue as described above.

Figure 4:
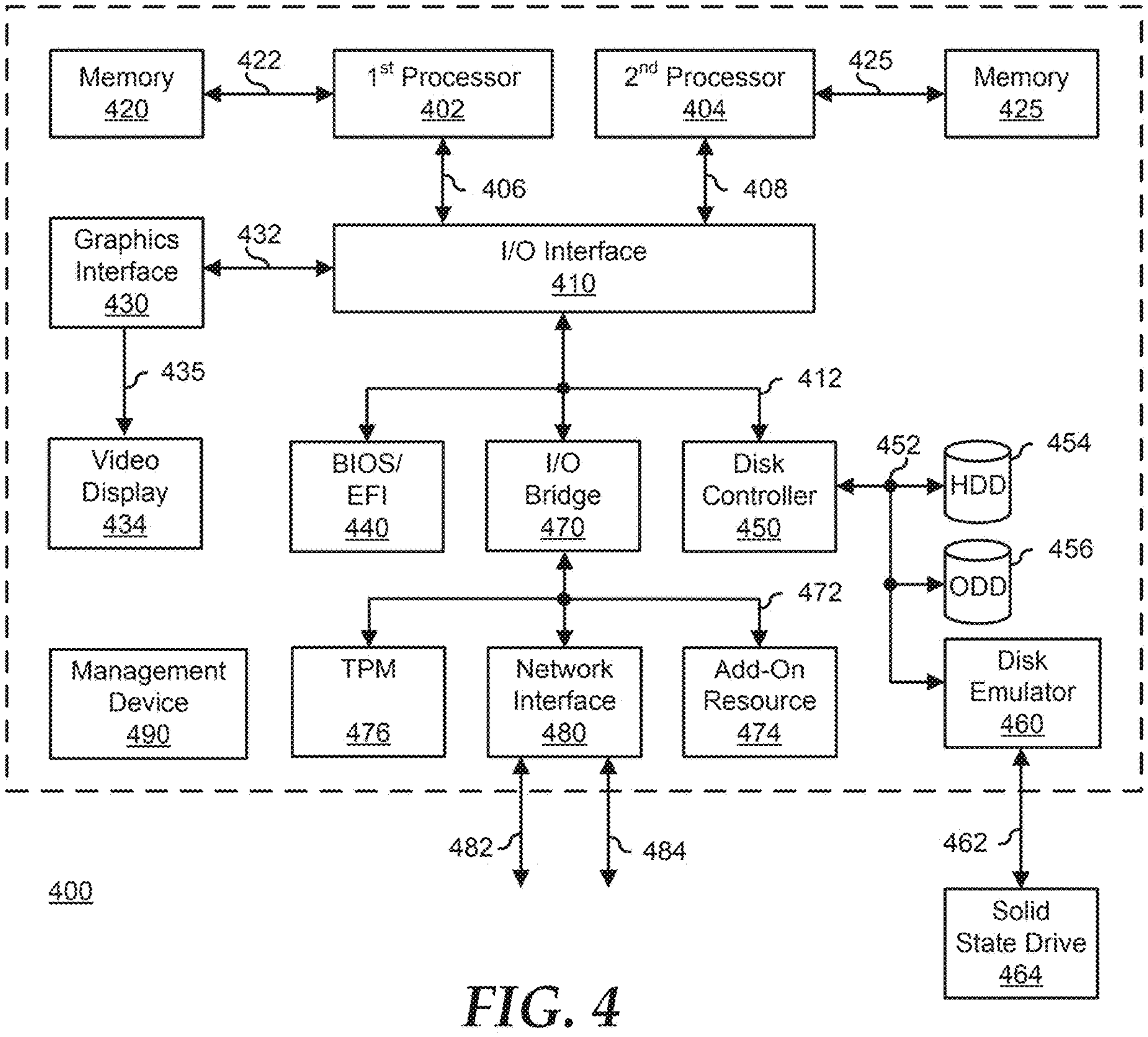
FIG. 4 is a block diagram of a general information handling system according to an embodiment of the present disclosure.

FIG. 4 shows a generalized embodiment of an information handling system 400 according to an embodiment of the present disclosure. Information handling system 400 may be substantially similar to information handling system 100 of FIG. 1. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 464, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 464, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:

an ultrasound processor to perform a wide area presence detection;

a vision processor to perform user presence detection, wherein the wide area presence detection of the ultrasound processor has a longer range as compared to the vision processor; and a processor to communicate with the ultrasound processor and with the vision processor, the processor to:

determine whether a user presence detection event has been received from the vision processor;

in response to reception of the user presence detection event, deactivate the ultrasound processor; and in response to the user presence detection event not being received:

deactivate the vision processor; and determine whether an object detection event has been received from the ultrasound processor.

2. The information handling system of claim 1, further comprising:

a microphone; and a speaker, wherein during the performance of the wide area presence detection:

provide, by the speaker, an ultrasound signal;

receive, by the microphone, a return ultrasound signal;

based on the return ultrasound signal, the ultrasound processor to determine whether an object is located in front of the information handling system; and based on the determination of the object being located in front of the information handling system, the ultrasound processor to provide the object detection event.

3. The information handling system of claim 1, further comprising:

a camera, wherein during the performance of the wide area presence detection:

the camera to capture a plurality of images;

based on the images, the vision processor to determine whether a user is located in front of the information handling system; and based on the determination that the user is located in front of the information handling system, the vision processor to provide the user presence detection event.

4. The information handling system of claim 3, wherein in response to a determination by the vision processor that the user is no longer located in front of the information handling system, the vision processor to provide a no user presence detection event.

5. The information handling system of claim 4, wherein in response to the no user presence detection event, the processor to activate the ultrasound processor and to deactivate the vision processor.

6. The information handling system of claim 1, wherein in response to reception of the object detection event, the processor further to:

activate the vision processor; and deactivate the ultrasound processor.

7. The information handling system of claim 1, wherein the vision processor enters a low power mode when deactivated.

8. The information handling system of claim 1, wherein the wide area presence detection has a first detection arc and the user presence detection has a second detection arc that is less than the first detection arc.

9. A method comprising:

determining, in an information handling system, whether a user presence detection event has been received from a vision processor of the information handling system;

in response to reception of the user presence detection event, deactivating an ultrasound processor of the information handling system, wherein the wide area presence detection of the ultrasound processor has a longer range as compared to the vision processor; and in response to the user presence detection event not being received:

deactivating the vision processor; and determining whether an object detection event has been received from the ultrasound processor.

10. The method of claim 9, wherein during the performance of the wide area presence detection, further comprising:

provide, by a speaker of the information handling system, an ultrasound signal;

receive, by a microphone of the information handling system, a return ultrasound signal;

based on the return ultrasound signal, determining, the ultrasound processor, whether an object is located in front of the information handling system; and based on the determination of the object being located in front of the information handling system, providing, by the ultrasound processor, the object detection event.

11. The method of claim 9, wherein during the performance of the wide area presence detection, further comprising:

capturing, by a camera of the information handling system, a plurality of images;

based on the images, determining, by the vision processor, whether a user is located in front of the information handling system; and based on the determination that the user is located in front of the information handling system, providing, by the vision processor, the user presence detection event.

12. The method of claim 11, wherein in response to a determination by the vision processor that the user is no longer located in front of the information handling system, further comprising: providing, by the vision processor, a no user presence detection event.

13. The method of claim 12, wherein in response to the no user presence detection event, activating, by the processor, the ultrasound processor and to deactivate the vision processor.

14. The method of claim 9, wherein in response to reception of the object detection event, further comprising:

activating the vision processor; and deactivating the ultrasound processor.

15. The method of claim 9, wherein the vision processor enters a low power mode when deactivated.

16. The method of claim 9, wherein the wide area presence detection has a first detection arc and the user presence detection has a second detection arc that is less than the first detection arc.

17. An information handling system comprising:

a microphone to provide an ultrasound signal;

a speaker to receive a return ultrasound signal;

an ultrasound processor in communication with the microphone and with the speaker, the ultrasound processor to perform a wide area presence detection;

a camera to capture a plurality of images; and a vision processor in communication with the camera, the vision processor to perform user presence detection, wherein the wide area presence detection of the ultrasound processor has a longer range as compared to the vision processor;

whereby the system determines whether a user presence detection event has been received from the vision processor; in response to reception of the user presence detection event, deactivates the ultrasound processor; and in response to the user presence detection event not being received deactivates the vision processor and determines whether an object detection event has been received from the ultrasound processor.

18. The information handling system of claim 17, wherein in response to a determination by the vision processor that a user is no longer located in front of the information handling system, the vision processor to provide a no user presence detection event.

19. The information handling system of claim 18, wherein in response to the no user presence detection event, the processor to activate the ultrasound processor and to deactivate the vision processor.

20. The information handling system of claim 17, wherein the wide area presence detection has a first detection arc and the user presence detection has a second detection arc that is less than the first detection arc.

* * * * *